F. R. ELLIS.
STRAINING DEVICE.
APPLICATION FILED MAR. 16, 1914.
1,160,154.
Patented Nov. 16, 1915.
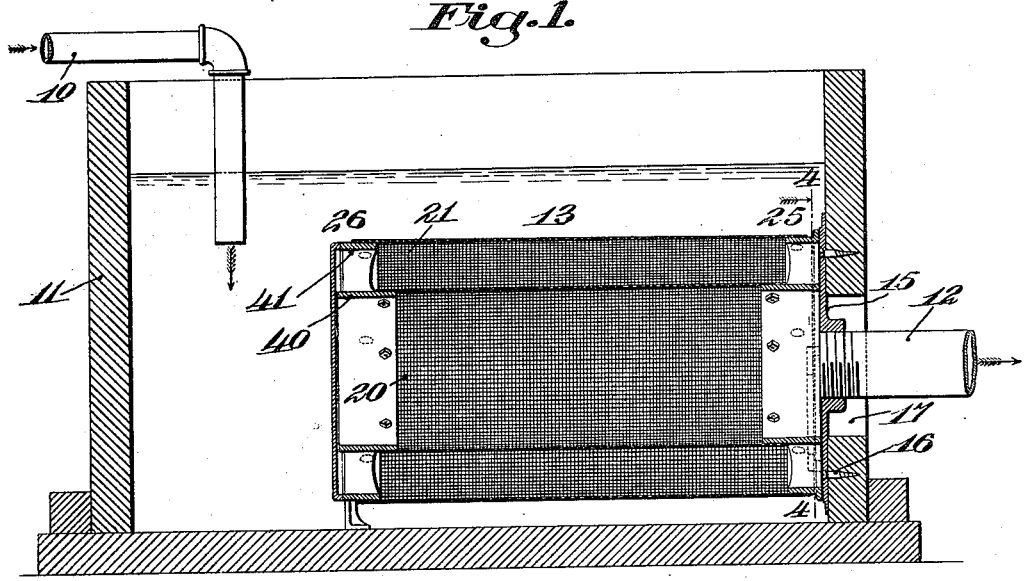
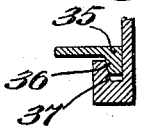
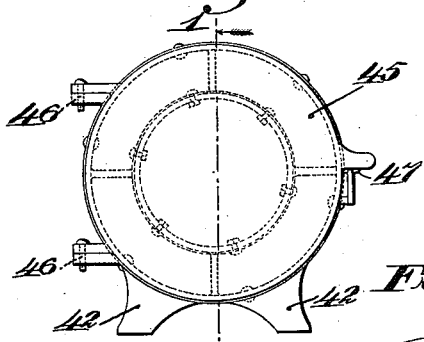
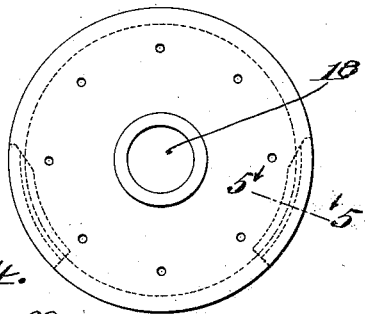
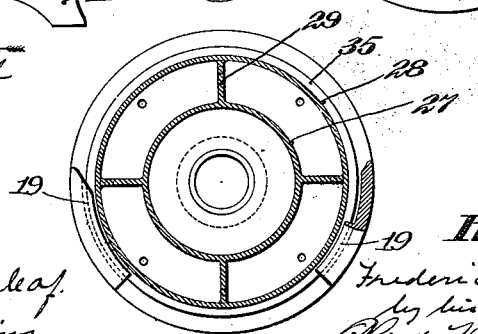
Witnesses
Frederick S. Greenleaf.
Geo. E. Stebbins.
Inventor
Frederic R. Ellis
by his attorneys
Phillipp Van Ourun & Fish

UNITED STATES PATENT OFFICE.

FREDERIC R. ELLIS, OF BOSTON, MASSACHUSETTS, ASSIGNOR TO B. F. STURTEVANT COMPANY, OF BOSTON, MASSACHUSETTS, A CORPORATION OF MASSACHUSETTS.

STRAINING DEVICE.

1,160,154.　　　　Specification of Letters Patent.　　Patented Nov. 16, 1915.

Application filed March 16, 1914. Serial No. 825,059.

*To all whom it may concern:*

Be it known that I, FREDERIC R. ELLIS, a citizen of the United States, residing at Hyde Park, Boston, in the county of Suffolk and State of Massachusetts, have invented certain new and useful Improvements in Straining Devices; and I do hereby declare the following to be a full, clear, and exact description of the invention, such as will enable others skilled in the art to which it appertains to make and use the same.

The present invention relates to straining devices, and more particularly to a straining device which comprises a strainer adapted to be placed in a tank for separating the dirt from the water drawn from the tank.

The object of the present invention is to produce a straining device of this kind in which the strainer can be easily removed and cleaned.

With this object in view, the present invention consists in a straining device hereinafter described and particularly pointed out in the claims.

In the drawings which illustrate the preferred embodiment of the invention, Figure 1 is a central section through the tank and strainer, the section line through the strainer being taken along line 1—1 of Fig. 2; Fig. 2 is a rear end elevation of the strainer; Fig. 3 is a front elevation of the plate removed from the tank; Fig. 4 is a section taken along the line 4—4 of Fig. 1 and Fig. 5 is a section taken along the line 5—5 of Fig. 3.

The present invention as illustrated is embodied in a straining device used with air washing apparatus. The dirty water from the air washer flows through the inlet pipe 10 into the sump tank 11, where the heavier particles of dirt are separated from the water by gravity. The particles of dirt which remain in suspension and which would be coarse enough to clog the pump or air passages of the apparatus are prevented from passing through the outlet 12 by means of the strainer 13. The strained water drawn through the outlet pipe 12 is again used in the air washer.

The plate 15 is secured to the inside of the tank by means of the screws 16, and closes an opening 17 cut through the side of the tank. The central portion of the plate 15 is provided with an orifice 18 into which is threaded the end of the outlet pipe 12.

The inside face of the plate 15 is finished substantially flat. Under cut ears 19 are located at the edges of the plate 15. As shown in Figs. 3 and 4 the ears are located on opposite sides of the lower half of the plate 15, and their under cut recesses face inwardly and upwardly.

The strainer 13 comprises inner and outer screen drums 20 and 21 of perforated sheet metal. The front and rear ends of the screen drums are supported by front and rear end frames 25 and 26 respectively. The front end frame 25 consists of inner and outer cylindrical collars 27 and 28 which are integrally connected together by the radially extending wings 29. The above described structure of the end frame produces an open-ended strainer, free access to the inside of the inner screen 20 being had through the circular opening through the collar 27 and free access to the space between screens 20 and 21 being had through the annular space between the collars 27 and 28. The ends of the collars 27 and 28 are finished to fit snugly against the flat inner face of the plate 15 so that the plate forms a closure for the open end of the strainer when the strainer is in place in the tank as shown in Fig. 1. When the strainer is in place the collars contact with the plate around the outlet orifice so that the water must pass through the screen drums supported by the collars.

The strainer is removably secured to the plate 15 by means of the outwardly extending flange 35 on the collar 28 which fits in the under-cut recesses of the plate ears 19. The rear face 36 of the flange 35 is inclined and fits against the inclined faces 37 of the under-cut recesses of the ears 19 so as to draw the end frame 25 snugly against the face of the plate 15 when the strainer is slipped into place in the tank.

The end frame 26 of the strainer consists of inner and outer collars 40 and 41 which support the rear ends of the screen drums 20 and 21. The end frame 26 is provided with legs 42 which support it on the bottom of the tank. The construction of the end frame 26 produces a strainer which is open at its rear as well as at its front end, access to the inside of the screen drum 20 being had through collar 40 and access to the space between the screen drums 20 and 21 being had through the annular collars 40 and 41. The open rear end of the strainer is normally closed by means of a door 45 which is hinged at 46 to the end frame 26 and is provided with a latch 47 for holding it closed. The inner face of the door fits snugly against the ends of the collars 40 and 41.

When the strainer is in place in the tank as shown in Fig. 1, water passes successively through the outer and the inner screens 20 and 21 and out through the outlet pipe 12. When the screens become clogged, the strainer is disengaged from the plate 15 by simply lifting it or moving it laterally so that it can easily be removed from the tank and cleaned. The outside of the strainer may be cleaned by playing a jet of water upon it and the inside of the strainer may be readily cleaned by opening the door 45 to afford unobstructed access from end to end of the strainer and directing a jet of water through it. After the strainer is cleaned, it is easily replaced by lowering it into the tank with the end frame 25 against the plate 15 so as to cause the flange 35 to engage the under-cut ears 19.

The present invention is not limited to its illustrated embodiment but may be embodied in other structures within the scope of the invention as set forth in the following claims:—

1. A straining device having, in combination, a plate provided with an orifice, under cut ears projecting from the plate, and a strainer having an open end fitting against and closed by the plate and provided with projecting portions removably received by the under cut ears so as to permit the strainer to be separated from the plate for cleaning.

2. A straining device having, in combination a plate having a substantially flat inner face and provided with an orifice through its central portion, under-cut ears projecting from the plate, an open-ended strainer including a screen drum and an end collar which fits against and is closed by the plate and is provided with an outwardly extending flange removably received by the under-cut ears so as to permit the strainer to be separated from the plate for cleaning.

3. A straining device having, in combination, a plate provided with an orifice, an open-ended strainer including a screen drum and an end collar which fits against the plate around the orifice so the plate forms a closure for the open end of the strainer, and means for removably securing the end collar to the plate having provision for separation of the collar from the plate by lateral movement.

4. A straining device having, in combination, a plate provided with an orifice, an open-ended strainer including two screen drums one inside of and spaced from the other and an end frame having inner and outer collars on which the ends of the screen drums are secured, said collars fitting against the face of the plate around the orifice so the plate forms a closure for the open end of the strainer, and means for removably securing the end frame to the plate having provision for separation of the collar from the plate by lateral movement.

5. A straining device having, in combination, a plate having a substantially flat inner face provided with an orifice through its central portion, ears on the edges of the plate having under cut recesses and a strainer including two screen drums one inside of and spaced apart from the other and an end frame comprising two collars to which the ends of the drums are secured, said collars fitting against the face of the plate so that the plate forms a closure for the open end of the strainer, and an outwardly extending flange on the outer collar removably received by the under-cut ears of the plate, so as to permit the strainer to be separated from the plate for cleaning.

6. A straining device having, in combination, a plate provided with an orifice, a strainer including two screen drums one inside of and spaced apart from the other, a front end frame having two collars upon which the front ends of the screen drums are supported and a rear end frame having two collars upon which the rear ends of the screen drums are supported, means for removably securing the front end frame to the plate with its collars fitting against the plate so that the plate forms a closure for the open front end of the strainer, and a door secured to the rear end frame and fitting against the ends of its collars so as to close the open rear end of the strainer.

FREDERIC R. ELLIS.

Witnesses:
 DOUGLAS BRADFORD,
 L. L. SARGEANT.

Copies of this patent may be obtained for five cents each, by addressing the "Commissioner of Patents, Washington, D. C."